United States Patent [19]

Uekusa

[11] 4,224,560

[45] Sep. 23, 1980

[54] METHOD FOR CONTROLLING PARISON WALL THICKNESS AND A WALL THICKNESS CONTROL SIGNAL GENERATOR CIRCUIT FOR CARRYING OUT THE METHOD

[75] Inventor: Hiroshi Uekusa, Chiba, Japan

[73] Assignee: Yoshino Kogyosho Co., Ltd., Tokyo, Japan

[21] Appl. No.: 815,766

[22] Filed: Jul. 14, 1977

[30] Foreign Application Priority Data

Jul. 23, 1976 [JP] Japan .................................. 51-87990

[51] Int. Cl.² ............................................ G05B 19/29
[52] U.S. Cl. ................................... 318/603; 318/573; 425/162; 425/451; 264/40.5
[58] Field of Search ............... 318/573, 601, 604, 603; 425/162, 451, 465; 264/40.5, 99

[56] References Cited

U.S. PATENT DOCUMENTS

| | | | |
|---|---|---|---|
| 3,410,177 | 11/1968 | Roess et al. ......................... | 318/604 |
| 3,936,713 | 2/1976 | Hunkar .............................. | 318/573 |

OTHER PUBLICATIONS

"Is Precision Parison Programming the Answer to Blow-Molders' Dreams?", *Plastics World*, Jun. 1970, pp. 58–61.
"Parison Programmer Traces New Profit Profile for Blow-Molders", *Plastics World*, Apr., 1971, pp. 46–49.

*Primary Examiner*—Gene Z. Rubinson
*Assistant Examiner*—Eugene S. Indyk
*Attorney, Agent, or Firm*—Fidelman, Wolffe & Waldron

[57] ABSTRACT

The present invention discloses an arrangement wherein a wall thickness of a plastic bottle formed by means of a blow-molding process is formed into the desired configuration by controlling the wall thickness of a parison from which the bottle is made. A control pin arranged opposite an extrusion outlet of an extruding machine for adjusting the wall thickness of the parison is finely moved in response to a fine step-like control voltage signal to thereby suitably set and vary the opening degree of the extrusion outlet of the extruding machine, thus obtaining the desired wall thickness for the parison.

6 Claims, 14 Drawing Figures

Fig.9

METHOD FOR CONTROLLING PARISON WALL THICKNESS AND A WALL THICKNESS CONTROL SIGNAL GENERATOR CIRCUIT FOR CARRYING OUT THE METHOD

The present invention relates to a method for controlling a parison to wall thickness, which can electrically set the wall thickness of a parison a desired value, and a wall thickness control signal generator circuit for carrying out the method. Timing pulses are generated in synchronism with the rotating operation of the extruding machine, and various settings and control pulses may be obtained on the basis of these timing pulses. Further, parison wall thickness values set by these timing pulses may be connected in a fine stepped variation mode to minimize the number of preset points and to render a smooth wall thickness variation between the preset points.

To control the parison wall thickness, a control pin is moved up and down to vary an area of a flow passage for the plastic molten resin in the extrusion outlet. Methods for moving the control pin up and down currently employed are roughly divided into (1) a disc cam and (2) a servo-mechanism.

(1) In the control means using the disc cam, the trailing end of the control pin is urged against the peripheral surface of the cam surface of a disc cam, and in this state, the disc cam is rotated in synchronism with the operation of the extruding machine to move the control pin up and down.

While the control of the parison wall thickness by means of the disc cam as described above has the advantage that the structure is simple and the operation is positive, it has been entirely unsuitable for statistical management because data are not possible to be obtained; a change in wall thickness setting is difficult; it requires much time and labor to set a configuration of the disc cam; a final configuration or contour of the disc cam is determined by an operator's sixth sense; and the like.

(2) On the other hand, in the control means using the servo-mechanism, the control pin is designed to be moved by means of a cylinder mechanism, and a supply of pressure to the cylinder mechanism, and a supply of pressure to the cylinder mechanism is controlled by the servo-mechanism.

Various methods have been proposed to utilize a servo-mechanism for the control of the parison wall thickness. One method is used wherein the parison wall thickness is set in response to a voltage. However, this method poses significant problems which include: (a) input to the servo-mechanism is a digital value and hence, the operation of the control pin is not smooth; (b) operation of the control pin is mechanically time delayed compared to an electrical signal in the servo-mechanism, and a displacement in timing between the electric signal and the control pin adversely affects the operation for controlling the parison wall thickness.

PRIOR ART

The most typical device for the control of parison wall thickness utilizing the servo-mechanism includes a pin board. In this device, a board has a number of pin inserting holes orderly made and disposed in columns and rows, the columns serving as points corresponding in timed relation to equally divided points along the length of a parison and the rows serving as equally divided voltage potential differences corresponding to a parison wall thickness to be controlled.

Outputs of each column from the pin board are successively removed in accordance with the operation of an extruding machine and are successively entered into a potentiometer connected to the extruding machine for rotation at a predetermined speed, and a voltage variation is obtained by linearly joining potentials at adjacent preset points.

In accordance with a control voltage generator circuit utilizing the pin board as described above, voltages at the preset points may be set merely by inserting pins into the holes in the rows corresponding to the desired voltage values. Accordingly, the voltage value may be simply set. Moreover, the voltage variation between adjacent preset points is along the straight line joining the voltage values at both preset points. Accordingly, this affords excellent operations and effects in that occurrence of mechanical delay of the control pin with respect to the voltage signal can be minimized, and the parison wall thickness may be formed substantially as set.

As described above, the control signal generator circuit utilizing the pin board possesses the excellent operations and effects peculiar thereto. However, since the molding speed of the extruding machine is high, the potentiometer, which finally forms the control signal, is extremely short in life, resulting in the necessity of frequent replacement of parts. In addition, the potentiometer used is extremly costly for exclusive use, resulting in high cost of storage expense as equipment. Furthermore, since setting of voltages at the respective preset points in the pin board must be effected by costly fine setting pins made of platinum or the like, the operation of setting voltages becomes complicated. Moreover, connection of a matrix circuit may be formed by the setting pins, thus requiring a certain degree of insertion retaining force. This sometimes causes the setting pins to be broken, and when the pins are broken, the entire pin board must be disassembled for removal of broken pins. Further, these setting pins are so small that they may easily be lost, thus requiring very careful handling and storing of them.

Furthermore, the preset voltage between the spaced preset points must be compared along the respective rows whenever necessary, so that it is difficult to perform the setting operation. Also, it is desirable to have more preset points and more voltage values (with means to vary the units of voltage value) in order to give good control signals. However, it has suffered from the drawback that the more points and voltage values provided the more difficult it will be to read the setting state of the pin board.

PRESENT INVENTION

The present invention relates to a method for controlling parison wall thickness and a wall thickness control signal generator circuit. More specifically, it is an object of the present invention to provide an arrangement wherein a portion between wall thickness potential values at equally divided points along the length of a parison is joined by fine stepped potential waveforms to provide a smooth operation and an accurate control of the parison wall thickness, and to increase the mechanical strength of a circuit for forming said fine stepped potential waveforms and thereby render the service life of the wall thickness control signal generator circuit semi-permanent.

It is a further object to provide an arrangement wherein the equally divided points are divided into groups of odd and even numbers for the setting of potentials to easily achieve a stepped potential variation between preset voltage values.

It is another object to provide an arrangement wherein the wall thickness of the parison at each equally divided point is not set to the voltage value used to directly set the wall thickness but is set to relative voltages by consecutive natural numbers whereby variation in wall thickness at the time of reading and at the time of setting may be understood short and clear.

The above and further objects and novel features of the invention will more fully appear from the following detailed description and preferred embodiments when the same is read in connection with the accompanying drawings. It is to be expressly understood, however, that the drawings are for purpose of illustration only and are not intended as a definition of limits of the invention.

In the drawings:

FIG. 2 illustrates the main pulse waves used in the present invention.

FIG. 5 which is composed of three drawings, is a digital setting circuit, FIG. 5A being a front view of a base board with rotary switches corresponding to the respective longitudinal parison points, FIG. 5B a front view of each rotary switch on the front surface of the base board, and FIG. 5C a longitudinal sectional side view showing a main portion of the construction of the rotary switch.

The present invention has been contrived in an effort to overcome all of the disadvantages of the prior arts. It provides an arrangement wherein voltages (individually preset and calculated corresponding in timed relation to equally divided points along the length of a parison) are successively removed in superposed fashion every half-period in accordance with pulses generated in synchronism with operation of an extruding machine, and thus successively removed voltages are formed into fine stepped portions by utilization of a voltage divider circuit to obtain control voltage signals. One embodiment of the present invention will now be described with reference to the accompanying drawings.

Figure 1:
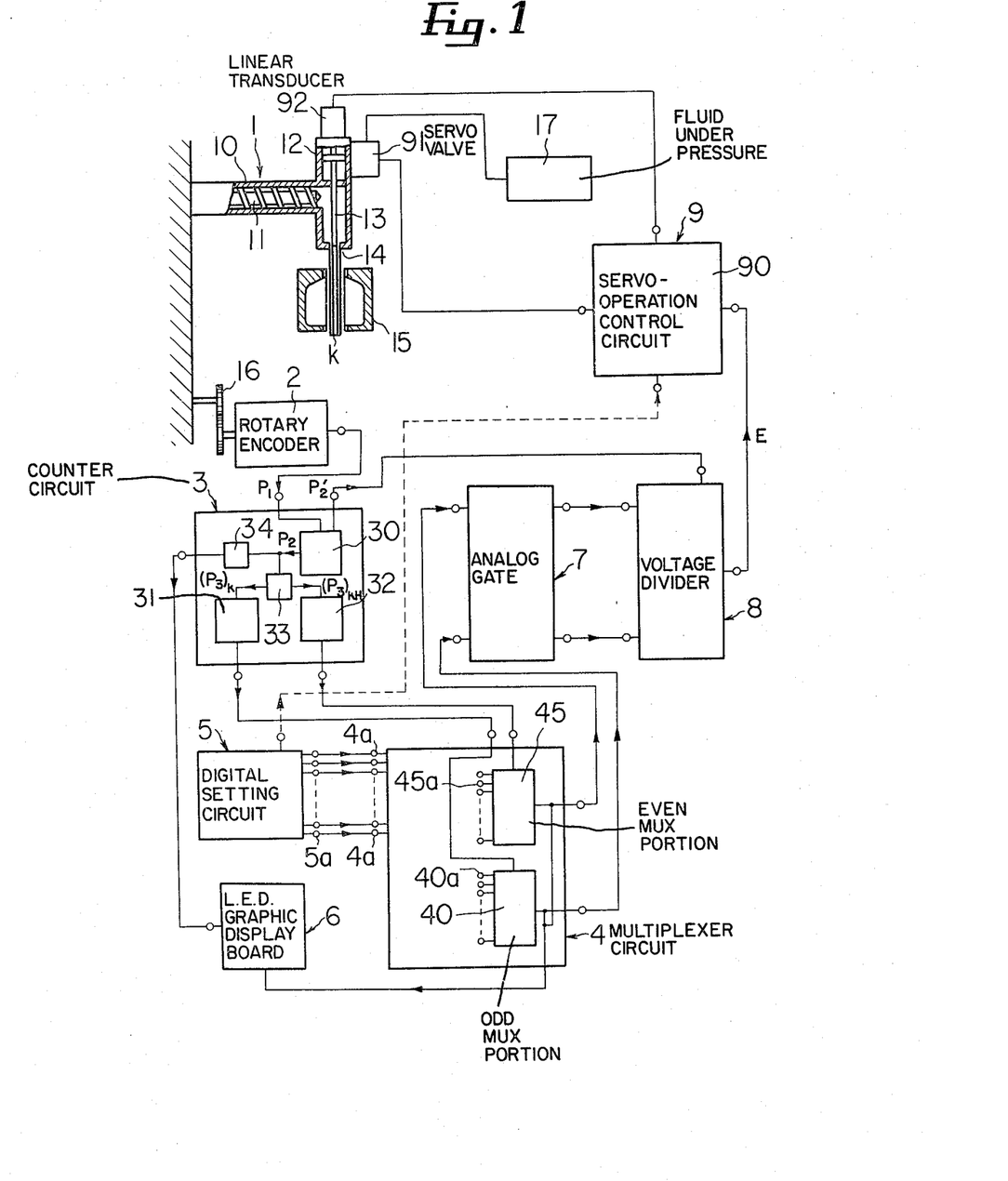
FIG. 1 is a block diagram showing a simple interconnection of a parison wall thickness control circuit embodying the present invention.

Referring to FIG. 1, the present invention relates to a method for controlling parison wall thickness in an extruding machine, wherein a heating cylinder 10 rotatably receives therein a screw 11; an extrusion outlet 14 is open to a lower end of a cylindrical body formed integral with and in communication with a foremost end of the heating cylinder 10 and to a position directly above die 15. A piston is integrally attached to an upper end of a control pin 13 within a cylinder 12, said control pin having its foremost end (a lower end in FIG. 1) opposed to the extrusion outlet 14, so that the control pin 13 may be moved up and down with respect to the extrusion oulet 14 in response to a supply of pressure fluids into a cylinder chamber of the cylinder 12. The supply of pressure fluids from a pressure source unit 17 (oil pressure is employed in most cases) to the cylinder 12 is controlled by a servo-valve 91, operation of which is controlled by a servo-operation control circuit 90. The present invention further relates to a signal generator circuit for generating control voltage signals 'E' for the servo mechanism 9.

A linear transducer 92 is mounted on the upper end of the cylinder 12 for detection of the moving state of control pin 13, a signal of which is fed back to the servo-operation control circuit 90, whereby a difference between the detection signal and control voltage signal E entered into the servo mechanism 9 is corrected.

That is, in an extruding station 1 composed of the servo-operation control circuit 90, servo-valve 91 and linear transducer p2, m/n points $x_i$ (having a one-to-one correspondence to m/n points $y_i$ along the length of the parison) are preset in timed relation with the operation of extruding station 1, where m=number of basic pulses and n=number of steps in the control voltage signal E. These points are preset by equally lengthwise dividing parison K. Actual voltage values $V_x$, which are obtained by equally dividing a potential $V_{7c-7d}$ corresponding to the wall thickness of parison K, are individually calculated corresponding to the respective points y.

Plural "basic pulses $P_1$" are generated in synchronism with the operation of the extruding station 1. "Preset voltage values $V_i$" are removed in superposed fashion every half-period, according to the points y; and the voltage potential between these successively removed preset voltage values is changed into fine stepped portions by equally dividing this potential in such a manner to form "control voltage signal E" which is entered into servo-mechanism 9 for control of the movement of control 13.

The structure of the present invention comprises a rotary encoder 2 for generating m "basic pulses $P_1$" during the process in which parisons K of a predetermined length are extruded and molded in synchronism with the extruding station 1, a counter 3 for forming "pulses $(P_3)_i$" and "count pulses $P_2$ prime", a digital setting circuit 5 and a multiplexer circuit 4 (for presetting the wall thickness of parison K at respective points "y", setting and multiplexing, calculating preset voltage values $V_i$, and removing these voltages in synchronism with the extrusion of parison K) an analog gate circuit for providing "actual voltage values" 7, and a voltage divider circuit 8 for connecting adjacent actual voltage values into fine stepped portions.

Next, the abovementioned various components of the present invention will be explained in order:

ROTARY ENCODER 2 (See FIG. 1):

Rotary encoder 2 is connected by means of a gear 16 to a drive source (not shown) of the extruding station 1 to generate, m "basic pulses $P_1$" (m=400 in the illustrated embodiment) in equally spaced relation and in synchronism with the operation of the extruding station 1.

It should incidentally be noted that (when the number of basic pulses $P_1$ required is 400) it is not always necessary for the rotary encoder 2 to directly generate all of the (400) basic pulses. Rather, rotary encoder 2 may serve to generate some (200) basic pulses, which are passed into a pulse double circuit to form (400) pulses which can be released as the basic pulses $P_1$.

This is due to the fact that it is often difficult in a mechanical sense, to generate a particular number of basic pulses during a single rotational operation of the rotary encoder 2, and if an attempt is made to forcibly generate a number of basic pulse waves directly from the rotary encoder 2, there occur inconviences such as difficulty in machining of the rotary encoder 2 and frequent mechanical failures.

On the other hand, where the pulses formed by the rotary encoder 2 are passed into a pulse doubler circuit to form the basic pulses $P_1$, the number of pulses generated by the rotary encoder 2 body can be reduced. Accordingly, the rotary encoder 2 may readily be manufactured, resulting in a substantial decrease in failure.

COUNTER 3 (See FIG. 1):

The counter circuit is for generating pulses to other circuits of the present invention so as to synchronously effect the predetermined operation on the basis of basic pulses $P_1$ from the rotary encoder 2. Counter circuit 3 comprises a change-over counter 30 for receiving the basic pulses $P_1$ from the rotary encoder 2 and orderly collecting "n" of these pulses (8 basic pulses in the illustrated embodiment, FIG. 2) to form "change-over pulse $P_2$" having plural m/n pulses m/n=400/8=50 pulses in the illustrated embodiment), and, for collecting "n" of the basic pulses $P_1$ to form a separate "count pulse $P_2'$"; a put-in (or distribution) circuit 33 for putting the pulse waves of the change-over pulse $P_2$ from the change-over counter 30 into the odd and even number counters 31 & 32 to form timing pulses $(P_3)_i$ having a pulse width twice that of change-over pulse $P_2$ (that is, a pluse width corresponding to 16 of the basic pulses $P_1$); counter 31 is for receiving odd-side timing pulses $(P_3)_k$, where k=all odd natural numbers, from the put-in circuit 33, and even counter 32 is for receiving an even side timing pulses $(P_3)_{k+1}$ from the put-in circuit 33.

MULTIPLEXER CIRCUIT 4 (See FIGS. 1,3,6 and 7):

Multiplexer circuit 4 is for orderly encoding the numbers $x_i$ having "preset voltage values" $V_i$ (preset at points $y_i$ in a digital setting circuit 5) in an order corresponding to the timing pulses $(P_3)_i$ every time one of these pulses from counter circuit 3 is entered. Multiplexer circuit 4 comprises odd-number multiplexer portion 40 for receiving the odd-number pulses $(P_3)_k$ and even-number multiplexer portion 45 for receiving the even-number pulses $(P_3)_{k+1}$.

Figure 6:
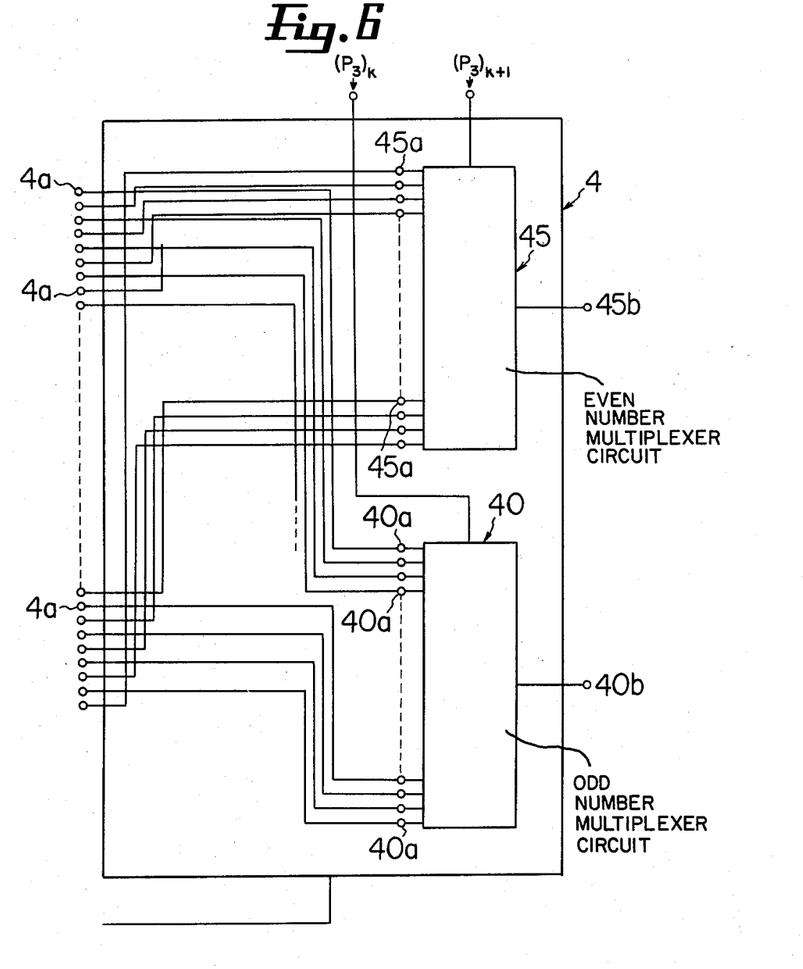
FIG. 6 illustrates a multiplexer circuit particularly showing how to put an input signal from the digital setting circuit in the odd and even-numbered multiplexers.
Figure 7:
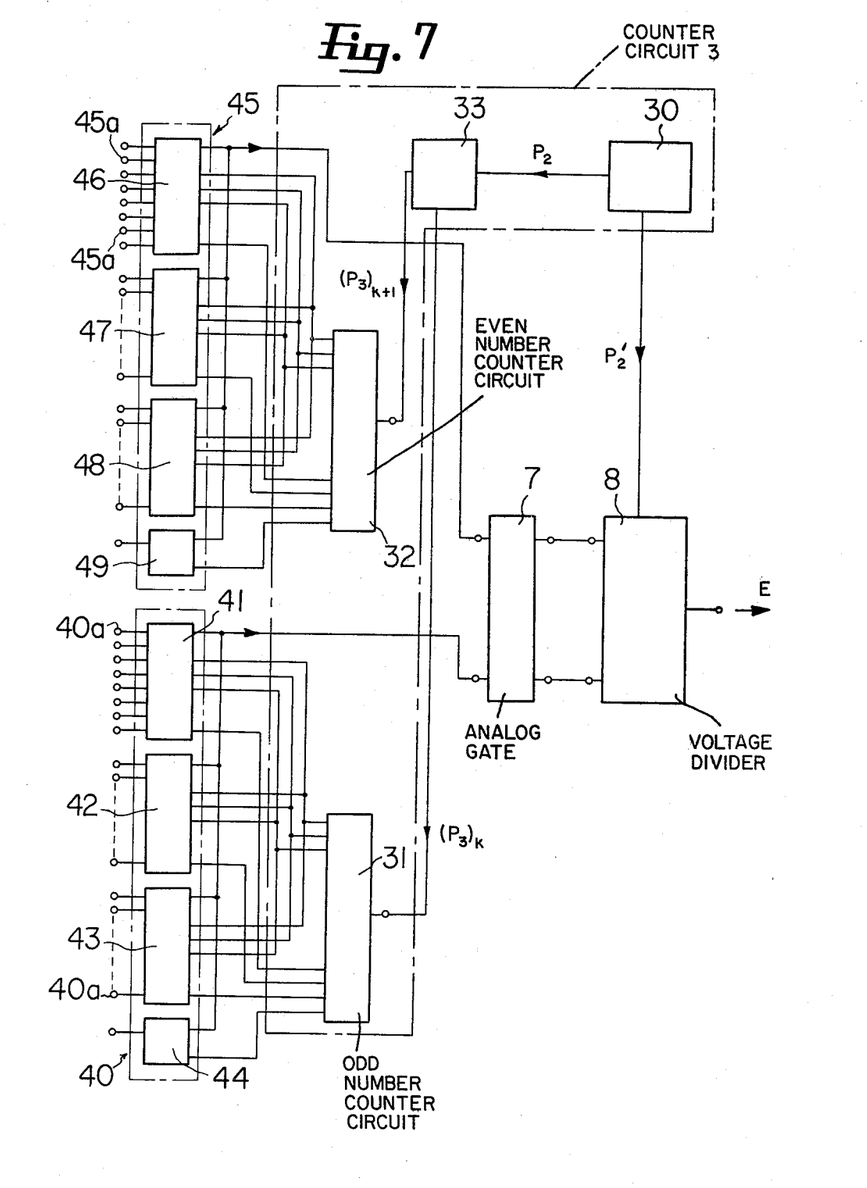
FIG. 7 is a connection diagram between part of the counter circuit 3, multiplexer circuit 4, analog gate 7, and divider circuit 8.

Multiplexer portions 40 and 45 comprise four switch circuits 41, 42, 43, 44 and 46, 47, 48, 49, respectively, and each has 25 input terminals 40a and 45a, respectively.

The respective input terminals 40a and 45a of the multiplexer portions 40 and 45 are connected to fifty output terminals 5A of the digital setting circuit 5 which individually release the preset numbers $x_i$ (as "multiplexed preset voltage values" preset at the respective points $y_i$ in the digital setting circuit 5), such that when pulses $(P_3)_i$ are entered, the "multiplexed preset voltage value" $V_i$ corresponding to the order of pulse $(P_3)_i$ is released to the multiplexer output terminal 40b or 45b.

Figure 5A:
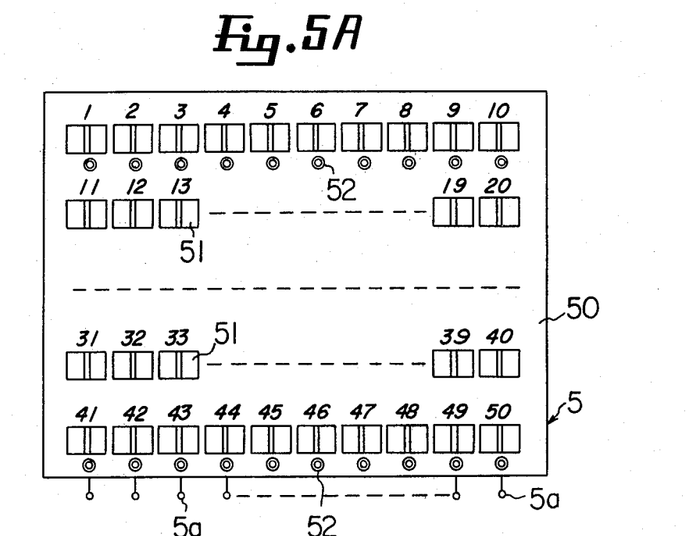
Figure 5B:
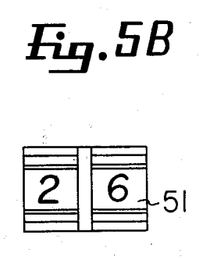
Figure 5C:
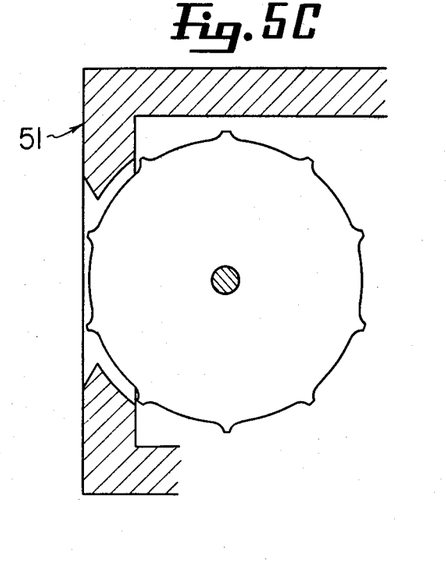

DIGITAL SETTING CIRCUIT 5 (See FIGS. 1,3 and 5(A), 5(B), and 5(C):

In the digital setting circuit 5, points $x_i$ are assigned to corresponding lengthwise equally divided points of $y_i$ of the parison K extruded by station 1 as a relative thickness value. Fifty rotary switches 51 for presetting points y are orderly arranged and fixed on a board 50, and an output from each of the switches 51 is introduced as the input to multiplexer circuit 4. The rotary switch 51 is designed so that the relative value (set by two digits in the illustrated embodiment) is preset by means of a rotary disc 51a. The rotary disc 51a is peripherally equally divided, each divided portion being indicated by natural numbers from 0-9.

One hundred different connection modes may be obtained for each two digits. Thus, natural numbers 0-99 are applied in these different connection modes so that the discs 51a may be operated to freely display the figures form 0-99 and to emit signals representative of said figures.

In the digital setting circuit 5 in which rotary switches 51 are assigned to respective points $y_i$, the preset numbers $x_i$ are for presetting relative sizes and degrees of wall thickness of the parison K corresponding to the points $y_i$, as opposed to setting the actual wall thickness values.

Figure 8:
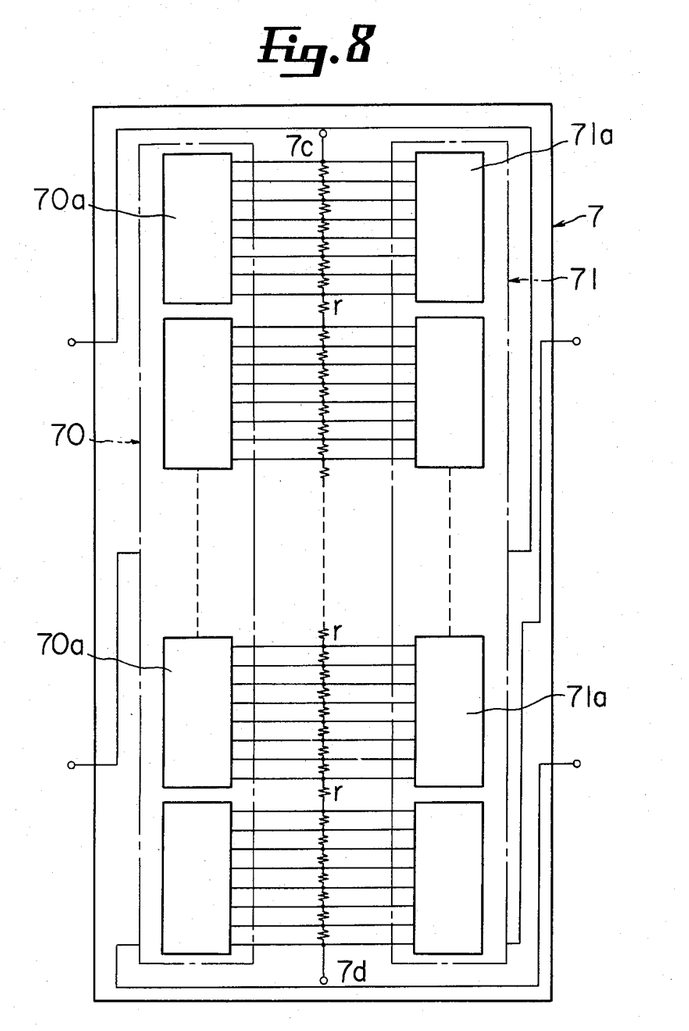
FIG. 8 is an electric connection diagram showing the construction of the analog gate.
Figure 9:
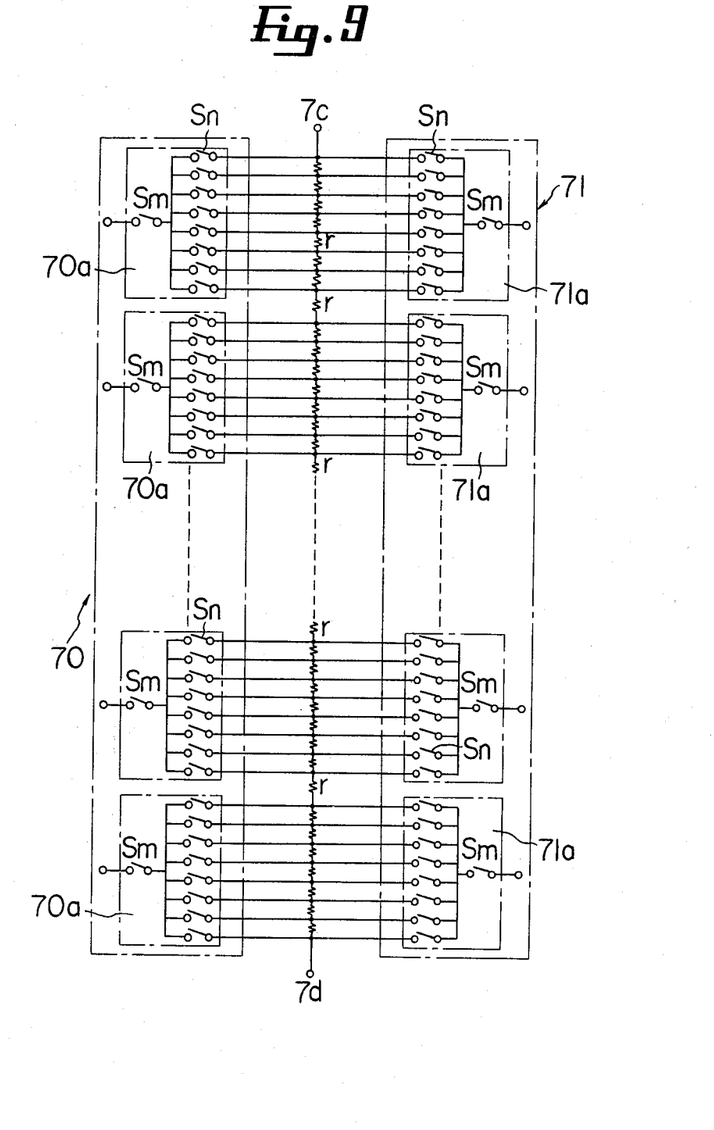
FIG. 9 is a view for explaining the structure of the analog gate of FIG. 8 in the form of a contact circuit.

ANALOG GATE 7 (See FIGS. 1, 8, and 9):

The analog gate 7 is a portion which individually receives the odd and even numbered "multiplexed voltage values" $V_{i\,mux}$ from multiplexer circuit 4 to generate "actual voltage values $V_x$" for setting the wall thickness. A potential difference $V_{7c-7d}$ corresponding to the maximal wall thickness of the parison K to be molded is applied to and between terminals of a circuit with fifty resistors r connected in series therewith so that nodes between resistors r may correspond to the preset numbers x, and the voltage values appearing between one of the terminals of this circuit and each node may display the actual thickness of the parison K.

That is to say, the analog gate 7 comprises a voltage divider circuit portion with fifty resistors r connected and inserted in series between two terminals 7c and 7d having a potential difference preset corresponding to the parison K wall thickness, and an odd number selection switch circuit 70 and an even number selection switch circuit 71 for removing the voltage values at the voltage divided points, wherein corresponding voltage divided points are connected (in accordance with the preset point signals from the multiplexer circuit 4) to remove the "actual voltage values V".

The odd number selection switch circuit 70 and the even number selection switch 71 comprise, respectively, selection switches 70a and 71a including a plurality of integrated circuits. The voltage divided point corresponding to a preset number x is connected in analog gate 7 in accordance with pulse $P_3$ (odd or even) to output the "actual voltage value V" in accordance with the preset number x.

Since the preset voltage value V is passed in accordance with the pulse $(P_3)_i$, there occurs an output at the same time width as that of pulse $(P_3)_i$. The suitable preset voltage value $V_i$ is released with a delay of half-period time as compared to the preceding preset voltage value $V_{i-1}$.

As a consequence, an odd number preset voltage value $V_k$ and an even number preset voltage value $V_{k+1}$ from the selection change-over switch circuits 70 and 71, respectively, are released in superposed fashion every half-period.

Figure 10:
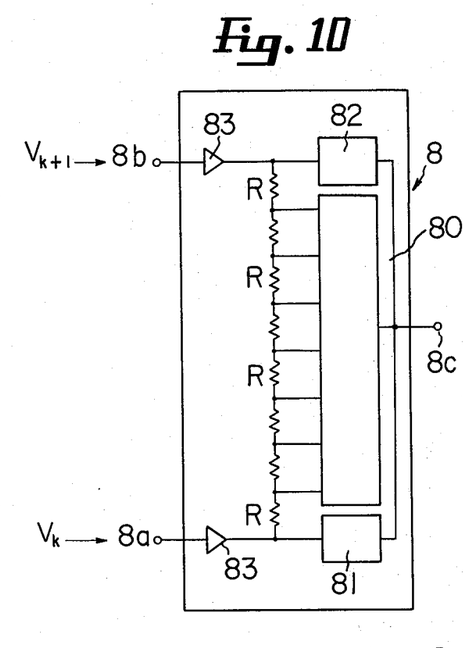
FIG. 10 shows an electric connection of the divider circuit.
Figure 11:
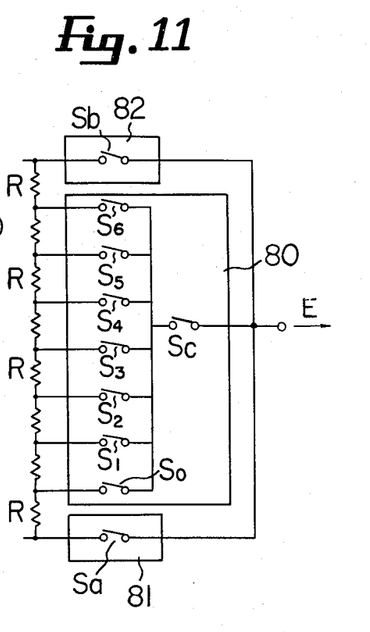
FIG. 11 is a view for explaining the divider circuit in the form of a contact circuit of FIG. 10.

DIVIDER CIRCUIT 8 (See FIGS. 1, 10, 11 and 12):

The divider circuit 8 is a portion in which the voltage variation (between actual voltage values $V_i$ and $V_{i+1}$ successively fed with a predetermined time width from the analog gate 7) is formed into fine stepped portions by utilizing the voltage divider circuit having resistors R, and forming final control voltage signals E. This circuit 8 includes a voltage divider circuit composed of resistors R, and a group of switches changed-over by the count pulses $P_2'$ from the counter portion 3.

The group of switches comprises a group of division switches 80, an odd number switch 81, and an even number switch 82. The group of division switches 80 connected to the nodes of the voltage divider circuit has switches $S_0, S_1 \ldots S_6$ connected to an output terminal 8c through a main switch Sc. Odd number switch portion 81 has a switch Sa connected on one side to an odd number input terminal 8a and the voltage divider circuit and on the other side to the output terminal 8c. Even number switch portion 8b has switch Sb connected on one side to an even number input terminal 8b and the voltage divider circuit and on the other side connected to the output terminal 8c.

Numeral 83 designates the rectifier circuits interposed between the odd number input terminal 8a (and the even number input terminal 8b) and the voltage divider circuit.

In the divider circuit 8, the switches Sa, Sb, Sc, So, $S_1 \ldots S_6$ are turned on and off by the count pulses $P_2'$ from the counter portion 3. In addition to the on and off operation, switches Sa, Sb and Sc are so preset as to effect the following operation:

First, the switch Sc remains turned on only when the input signal of an even-numbered preset voltage value V is entered into the even number input terminal 8b but remains turned off in the absence of this input signal.

The switches Sa and Sb are such that when one is in an "on state", the other is in an "off state".

Further, the switch Sa is so set that when the switch Sc is turned off, the switch Sa maintains its "on" position regardless of input of the count pulse $P_2'$.

Figure 12:
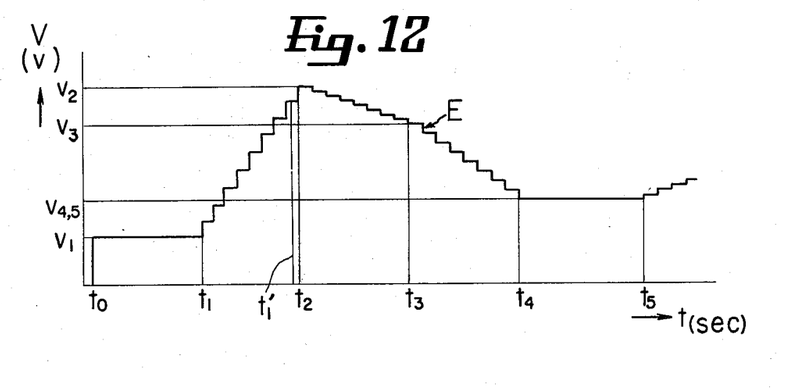
FIG. 12 shows an example of a waveform of a control voltage signal, particularly including an initial portion thereof where the control voltage signal is about to be formed.

Referring to FIGS. 11 and 12, since the switches Sa, Sb and Sc are set in the operational mode as described above, when the initial preset voltage value $V_1$ is entered into the odd number input terminal 8a at time $t_0$, the switch Sa will be turned on by the input of the preset voltage value $V_1$ and the preset voltage value $V_1$ is naturally released to the output terminal 8c.

Simultaneously with the input of the initial preset voltage value $V_1$, the count pulse $P_2'$ from the counter circuit 3 is entered into the divider circuit 8 to actuate the various switches. However, since succeeding preset voltage value $V_2$ is not entered into the even number input terminal 8b until time $t_1$, the switch Sc remains turned off. Therefore, even if count pulses $P_2'$ are entered between time $t_0$ and $t_1$, the switch Sa remains turned on and the preset voltage value $V_1$ is released to the output terminal 8c.

Next, when the preset voltage value $V_2$ is entered into the even number input terminal 8b at time $t_1$, the switch Sc is changed over to the on position, switch Sa is turned off, and switches $S_0$–$S_6$ are turned on and off in order by count pulses $P_2'$. In this manner, the switches are orderly changed over to form fine stepped voltage waveforms (as in FIG. 12) resulting from equal division of the potential difference between the preset voltage values $V_1$ and $V_2$.

At final time $t_1'$ when the preset voltage value $V_1$ is applied to the odd number input terminal 8a only switches $S_6$ and Sc are in their on position while all other switches are in their off position.

When the input of the preset voltage value $V_1$ into the odd number input terminal 8a is completed and the preset voltage value $V_3$ is subsequently entered into terminal 8a at time $t_2$, switch Sb is turned on by the next count pulse $P_2'$. At the same time, switch $S_6$ is turned off and the preset voltage value $V_2$ is naturally released to the output terminal 8c.

In this manner, the preset voltage value $V_k$ shares its first half period of time with the previous preset voltage value $V_{k-1}$ and its latter half period with the following preset voltage value $V_{k+1}$ to be formed into the control voltage signal E, which is released from the output terminal 8c to the servo-mechanism.

Incidentally, as is apparent from the foregoing, the switch Sc remains turned off until time $t_1$ and assumes the on position after time $t_1$, and other switches Sa, Sb, $S_0 \ldots S_6$ are quite equally successively changed over in accordance with the count pulse waves.

Further, the potential difference between preset voltages $V_k$ and $V_{k+1}$ are equally divided by the voltage divider circuit.

In the change-over of the switches, Sa, Sb, $S_0 \ldots S_6$ by means of the count pulse $P'_2$ it may be advantageous to turn off the first stage switch by means of the turning on operation of the switch turned on by the input of the count pulse wave in order to obtain a clear control voltage signal E without transient phenomenon.

Figure 4:
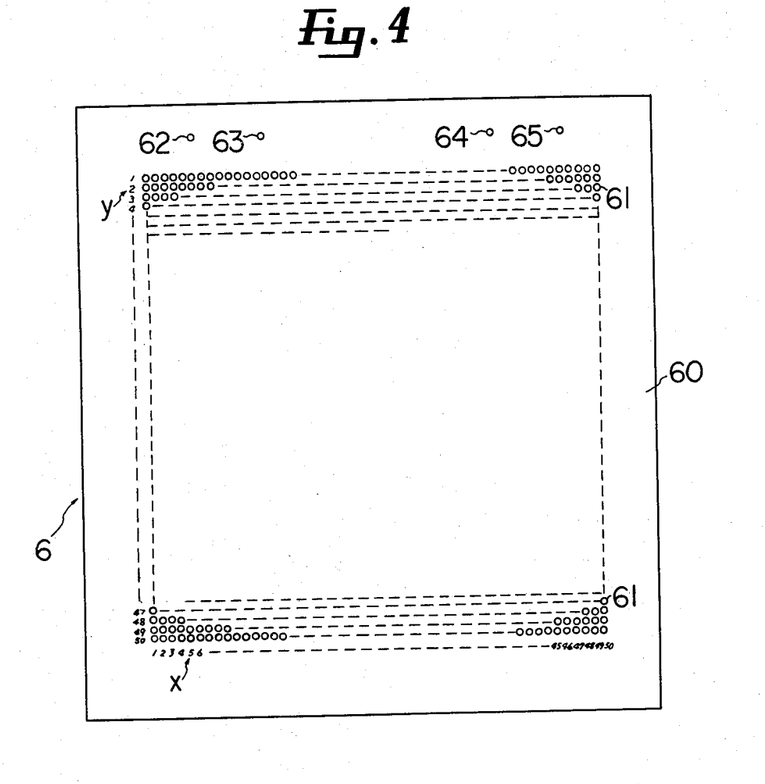
FIG. 4 is a front view of a graphic board for displaying on the surface thereof setting variations in parison wall thickness.

GRAPHIC BOARD (See FIGS. 1 and 4):

While the graphic board 6 does not form a constituent feature of the preset invention, it has a very important function to carry out the present invention. In this graphic board, the sizes of the preset number x at the points y may be displayed so that they may be judged at a glance whereby one may see the operation of the extruding station 1 and the setting condition of the wall thickness.

That is, the graphic board 6 comprises a flat plate base board 60, on the surface of which is disposed plural $[(m/n) \times (z) = 2,500$ in the illustrated embodiment] light emitting diodes 61 extended over $m/n = y$ lines and $z = x$ rows, with each line corresponding to a point $y_i$ and each row to a preset number $x_i$.

Hence, when the preset numbers $x_i$ at points $y_i$ are set in the digital setting circuit 5, the light emitting diode 61 corresponding to the preset points $x_i$ is displayed at point $y_i$ to display the relative thickness at each point $y_i$.

Thus, the graphic board 6 utilizes the positional relationship of the light emitting diodes 61 to geometrically display variations of the wall thickness of the parison K to be controlled. The operator can view the arrangement of the light emitting diodes 61 to find the wall thickness variation of the parison K to be formed. Accordingly, preset numbers $x_i$ suitable for mechanical operation of the extruding station 1 may simply be set.

Further, a position pulse counter 34 is provided to receive the change-over pulse $P_2$ from the change-over counter 30. The position pulse from the position pulse counter 34 is entered into the graphic board 6. For example, the position pulse from the position pulse counter 34 is entered into the first preset number row $x_1$ or the fiftieth preset number row $x_{50}$, which are hardly used; then, the light emitting diodes 61 in that preset number row may be changed over in response to the input of the position pulse wave to thereby find the state of the extruding operation of the parisons K in the extruding station 1.

Reference numeral 62 designates a power source lamp arranged on the surface of base board 62 to indicate energization of the power source; 63 is a pressure source operation lamp to indicate normal operation of pressure source unit 17; 64 is a display lamp which is lighted every time the parison K of a predetermined length has been extruded and molded or one step is completed; and 65 is a chip cut lamp to indicate cutting of the parison K by means of the control pin 13 in a chip cut operation.

CHIP CUT

When the parison K is extruded and molded a predetermined length, the parison K must be severed to disengage it from the extruding station 1. However, in the automatic molding of parisons as in the preset invention, generally the control pin 13 is sufficiently moved down to make the parison K into extremely thin wall thickness or to place the same into a completely severed state.

This is generally called "chip cut". The limit position of downward movement of the control pin 13 required for the "chip cut" is constant in the individual extruding machine. If the preset numbers $x_i$ at the desired points $y_i$ requiring the "chip cut" are set to values that may subject the parison to a "chip cut", no specific "chip cut" signal is required. Because parisons K are continuously extruded and molded, points $y_i$ requiring the "chip cut" are not limited in position. However, in view of display of the parison K wall thickness variations by means of the light emitting diodes 61, it is advantageous to have the "chip cut" points $y_i$ set to either the upper or the lower ends.

Accordingly, in FIG. 5A, push button chip cut presetting switches 52 are located under the first ten and last ten rotary switches 51.

The provisions of the chip cut presetting switches 52 independently of the rotary switches 51 allows for simple setting of the positions of the "chip cuts".

OPERATION

Next, the operation of the wall thickness control signal generator circuit in accordance with the present invention will be explained.

Before the extruding station 1 is driven, the power source of the circuit according to the present invention is energized to light the power source lamp 62 thereby ensuring that electric power is entered, after which the rotary switches 51 are operated in the digital setting circuit 5 to set the preset numbers $x_i$ of the respective points $y_i$.

When setting the rotary switches 51, the preset numbers $x_i$ at the respective points $y_i$ are immediately displayed by the corresponding light emitting diodes 61 on the graphic board 6. Preferably, the preset numbers $x_i$ are set while monitoring the graphic board.

It will of course be understood that preset numbers $x_i$ corresponding to standard or reference wall thickness values are determined prior to their setting, and preset numbers $x_i$ of the respective points $y_i$ may be set depending upon the sizes required.

Simultaneous with the setting of the preset numbers $x_i$ the "chip cut" setting switch 52 at the desired point $y_i$ is depressed to preset the chip cut position. Thereafter, the extruding station 1 is driven to extrude and mold the parisons K.

When the extruding station 1 starts to operate, the rotary encoder 2 connected to the drive source of the extruding station 1 is actuated to generate basic pulses $P_1$ which are fed into the counter circuit 3.

Figure 2:
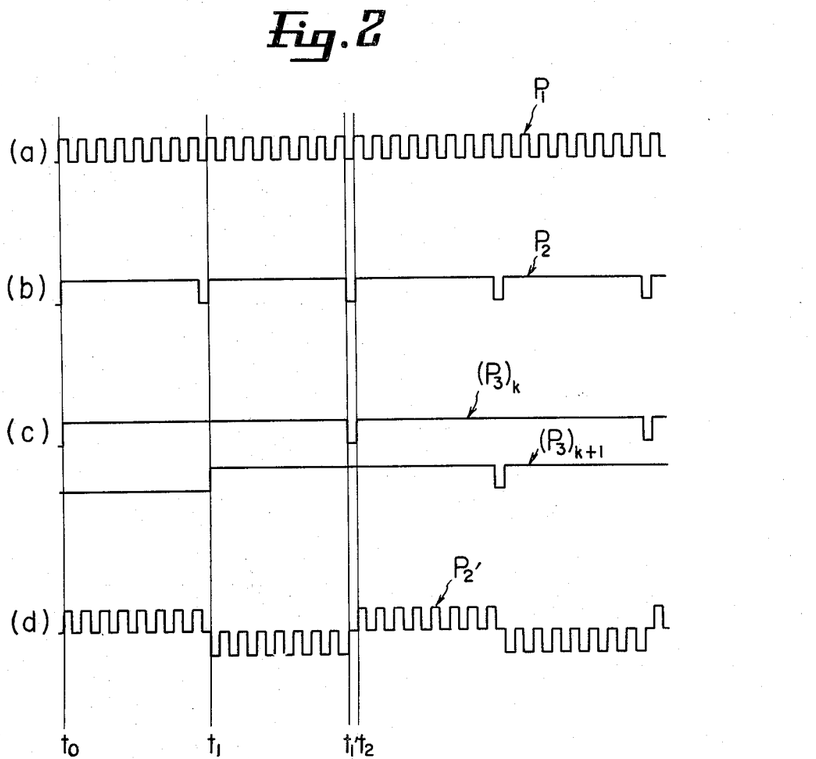
FIG. 2 shows (a) basic pulse $P_1$ generated by a rotary encoder, (b) change-over pulse $P_2$ formed on the basis of said basic pulse, (c) odd pulse $(P_3)_k$ and even pulse $(P_3)_{k+1}$ formed from the change-over pulse to remove preset numbers at respective points, and (d) count pulse $P_2'$ used to sub-divide a preset voltage value.
Figure 3:
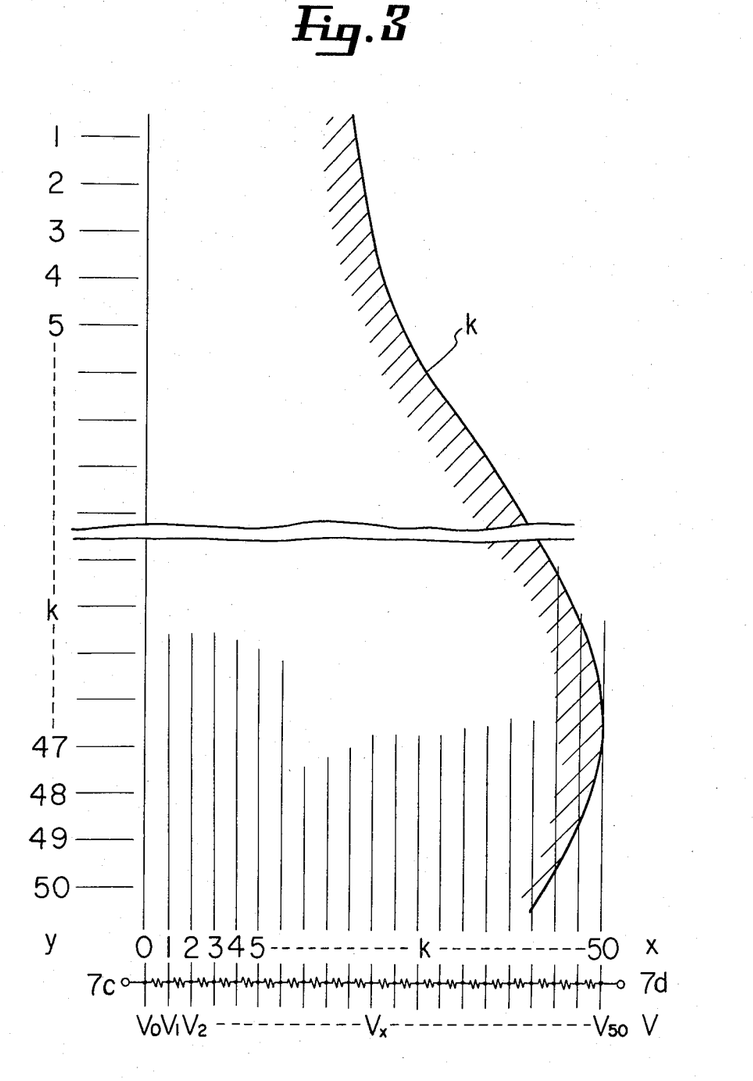
FIG. 3 schematically illustrates a basic conception of points, preset numbers and actual voltage values to parisons.

A plurality of "m" basic pulses $P_1$ fed into the counter circuit 3 are first formed by change over counter 30 into m/n change-over pulses $P_2$ in the form of FIG. 2b, and count pulses $P_2'$ formed by collecting eight basic pulses in the form of a basic pulse $P_1$ waveform as in FIG. 2d. The change-over pulse $P_2$ is entered into put-in circuit 33, where it is divided into the odd number pulse $(P_3)_k$ and the even number pulse $(P_3)_{k+1}$ where K represents an odd natural number.

These odd and even number pulses are sixteen basic pulses wide, with the phase of the odd number pulse leading the even number pulse by 180 degrees. Hence they overlap each other as best seen in FIG. 2c.

The odd and even pulses, $(P_3)_k$ and $(P_3)_{k+1}$, are entered into respective odd and even multiplexer portions 40 and 45 of multiplexer circuit 4. Also entered into the odd and even multiplexer portions 40 and 45 are the preset voltage values $V_i$ which are preset by numbers $x_i$ at points $y_i$ in the digital setting circuit 5. Each multiplexer portion 40 and 45 in FIG. 7 comprises four $2^n \times 1$ multiplexers (n=3 in three of these multiplexers and n=0 in the other one), such that each of these $2^n \times 1$ multiplexers has $2^n$ inputs, 1 output, n selection lines, and 1 enable line. The selection and enable signals are furnished by the respective odd and even number counter circuits 31 and 32, and the input signals are the "preset voltage value" signals $V_i$ from digital setting circuit 5 which are representative of preset numbers $x_i$.

That is, when pulses $(P_3)_k$ and $(P_3)_{k+1}$ are entered into counter circuits 31 and 32 to actuate multiplexer portions 40 and 45, the preset numbers $x_i$ for respective odd and even points $y_i$ are entered into multiplexer circuit 4 as "preset voltage values" $V_i$ from digital setting circuit 5.

The "multiplexed voltage values" $V_{i\ mux}$ from multiplexer circuit 4 (which are voltage signals having magnitudes corresponding to the sizes of preset numbers $x_i$ and signal widths equal to the respective pulse widths $P_3$) are entered into respective odd and even number selection change-over switch circuits 70 and 71 of analog gate 7.

As previously described, analog gate 7 is where "multiplexed preset voltage values" $V_{i\ mux}$ (which are merely representative of relative sizes between one another and are not values to determine the amount of movement of the control pin 13 corresponding to the wall thickness to be controlled of the parison K) are converted into the "actual voltage values $V_x$" to determine the actual wall thickness of parison K by letting that thickness correspond to a potential difference $V_{7c\text{-}7d}$ (to thus preset positions of the control pin 13) by equally dividing said potential difference into fifty portions with a voltage divider circuit 7 using resistors r. Both of the selection change-over switch circuits 70 and 71 are composed of a number of selection change-over switches 70a and 71a, whereby terminals at voltage divided positions corresponding to the "multiplexed preset voltage values" $V_{i\ mux}$ entered are turned on to release the "actual voltage values $V_x$" corresponding to the preset numbers $x_i$. Various methods may be employed in terms of electronic circuits to produce the "actual voltage values $V_x$". Both of the selection change-over switch circuits 70 and 71 are composed of selection change-over switches 70a and 71a using integrated circuits provided with a number of non-contact switches as shown in FIG. 9. Accordingly, it may be advantageous to produce the "actual voltage values $V_x$" by dividing the "multiplexed voltage values" $V_{i\ mux}$ into a BCD code and a binary code in the stage preceding the analog gate 7 to provide for selection of main switch Sm and selection of voltage divider switch Sn in the respective selection change-over switches 70a and 71a.

In complete synchronism with pulses $P_{3k}$ and $P_{3k+1}$ applied from the counter circuit 3 to the multiplexer circuit 4, the "actual voltage values $V_x$" obtained from analog gate 7 are divided into odd and even values and entered into the voltage divider circuit 8.

When a suitably numbered "actual voltage value $V_x$" from the analog gate 7 is entered into divider circuit 8, a count pulse $p_2'$ is entered simultaneously. The first half-period of "actual voltage values $V_x$" (the period of $V_x$ corresponds to the period of $P_3$) is formed into fine stepped voltage variations by equally dividing the potential difference between preset voltage values $V_k$ and $V_{k-1}$ into eight portions, whereas the second half-period of the preset voltage value $V_k$ is formed into fine stepped voltage variations by equally dividing the potential difference between preset voltage values $V_k$ and $V_{k+1}$ into eight portions. Thus successive fine stepped "control voltage signals E" are generated by the "actual voltage values $V_x$" in superposed fashion every half-period and said "control voltage signals E" are entered into servo-mechanism 9 to control the wall thickness of parison K.

As described above, the present invention provides "control voltage signals E" of the type in which "actual voltage values $V_x$" are joined by fine voltage steps formed by the voltage divider circuit 8 using resistors R, such that operation of control pin 13 at the time corresponding to the respective "actual voltage value $V_x$" becomes relatively smooth.

Furthermore, since the "multiplexed preset voltage values" $V_{i\ mux}$, required to control the wall thickness of parison K may automatically be converted to "actual voltage values" $V_x$ by the analog gate 7, the operator may merely set the wall thickness on the basis of the sizes of successive natural numbers and thus provide a very simple operation of controlling the wall thickness of parison K without error.

In addition, since signals are generated and formed on the basis of the basic pulse $P_1$ from the rotary encoder 2, a complete synchronism of the signals will result and no failure due to displacement of synchronism occurs at all.

Moreover, all components are composed of non-contact circuits, and therefore, have an extremely long period of time.

Incidentally, where the wall thickness of parison K is to be varied or changed, all that need be done is to reset the potential difference $V_{7c\text{-}7d}$ applied between terminals 7c and 7d of analog gate 7; other operations remain unchanged.

Further, where a point y subject to chip cutting is preset by means of the chip cut setting switch 52, this "chip cut signal" is directly entered from the digital setting circuit 5 into servo-operation circuit 90 (as indicated by the dotted lines in FIG. 1) when the change-over pulse $P_2$ assumes the specific position of the preset point y having the chip cut set.

As is obvious from the foregoing description, movement of the control pin 13 may be controlled by the "control voltage signals E" wherein portions between the "actual voltage values $V_x$" are connected by fine voltage steps, and hence, the operation of the control pin 13 is smooth and accurate. Formation of the "control voltage signals E" may be achieved by a voltage divider circuit 8 using resistors R (combined with non-contact switch circuit 7 utilizing integrated circuits) to afford a semi-permanent service life and an accurate operation for a long period of time. In addition, the operator may set the wall thickness of parison K (with the sizes of successive natural numbers) without paying attention to the actual voltage values required. Hence, a very simple and accurate setting operation will result. Thus, the present invention exhibits various excellent operations and effects for the method of controlling parison wall thickness and for the control signal generator circuit to carry out said method.

I claim:

1. A method for controlling a parison wall thickness in which a parison of predetermined length is divided into an equally spaced first set of points along said length and control voltages are assigned to said first set of points for moving a control pin relative to an extrusion outlet of an extruding machine in response to said control voltages, comprising the steps of:

(a) dividing said wall thickness into an equally spaced second set of points having a one-to-one correspondence to said first set of points and assigning preset numbers, representative of said wall thickness and for establishing relative preset voltage values, to said second set of points;

(b) assigning a voltage potential difference to said wall thickness, and dividing said voltage potential difference into m/n actual voltage values;

(c) generating m basic pulses in mechanical synchronism with said extruding machine and feeding said basic pulses into means for providing m/n change-over pulses, m count pulses, m/2n odd timing pulses, and m/2n even timing pulses offset by a half-period with respect to said odd timing pulses;

(d) feeding said timing pulses and said relative preset voltage values to a multiplexer means for releasing odd and even multiplexed preset voltage values under the control of said odd and even timing pulses;

(e) feeding alternate odd and even multiplexed preset voltage values to said equally divided voltage potential difference and gating odd and even actual voltage values, according to said odd and even multiplexed preset voltage values, into a voltage stepping means for providing a stepped control voltage in timed relation with said count pulses;

(f) moving said control pin through said servomechanism by means of said control voltage.

2. A method as in claim 1, further comprising the step of:

(f) setting a chip-cut switch corresponding to a selected one of said second set of points and providing a chip-cut signal to said servo-mechanism.

3. A method as in claim 1, further comprising the step of:

(f) indicating the position of said parison relative to said control pin during an extrusion cycle.

4. An extruding machine having a control pin tip opposed to an extrusion outlet and moved in accordance with a control voltage fed through a servo-mechanism to control wall thickness of a parison and a parison wall thickness control voltage generator circuit comprising:

(a) a rotary encoder mechanically connected to and synchronized with said extruding machine for generating m basic pulses during extrusion of a parison of a predetermined length;

(b) a main counter means for receiving said basic pulses and for generating n groups of m count pulses, m/n changeover pulses, m/2n odd timing pulses, and m/2n even timing pulses offset by a half-period with respect to said odd timing pulses;

(c) a digital setting means having plural switches for setting preset numbers having a one-to-one correspondence to equally divided points along the length of said parison and for generating relative preset voltage values corresponding to said preset numbers;

(d) a multiplexer means receiving said odd and even timing pulses and said relative preset voltage values and for multiplexing said preset voltage values under the control of said odd and even timing pulses to generate odd and even multiplexed preset voltage values, whereby said preset voltage values are divided into odd and even preset voltage values corresponding to alternate sequential ones of the preset numbers and are released to respective odd and even outputs of said multiplexer means in accordance with said odd and even timing pulses;

(e) an analog gate means having an odd input and an even input and a potential difference, assigned to said wall thickness, across a voltage divider means for equally dividing said potential difference into m/n parts to establish m/n actual voltage values and for gating alternate ones of said actual voltage values to respective odd and even outputs in accordance with said odd and even inputs of multiplexed present voltage values from said multiplexer means, whereby each even output voltage overlaps, in time, each odd output voltage by one half-period;

(f) another voltage divider means, receiving said count pulses and having respective odd and even inputs for said actual voltage values, for equally dividing the voltage difference between the odd input and the even input into n portions to generate a stepped control voltage output under the control of said count pulses, whereby each even input voltage shares its first half-period of time with the previous odd input voltage and its last half-period of time with the following odd input voltage during said voltage division.

5. An apparatus as in claim 4, wherein said main counter circuit comprises a change-over counter circuit, an odd number counter circuit, an even number counter circuit, and a put-in counter circuit, said change-over counter circuit forming change-over pulses and count pulses, said put-in counter circuit doubling the pulse width of each entering change-over pulse and putting odd numbered pulses into said odd number counter circuit and even-numbered pulses into said even number counter circuit.

6. An apparatus as in claim 4, wherein said multiplexer means comprises an odd multiplexer circuit receiving said odd timing pulses and an even multiplexer circuit receiving said even timing pulses, wherey odd numbered preset voltage values are sequentially released to the odd output of said multiplexer means by said odd multiplexer circuit for the time duration of respective sequential odd timing pulses received, and even numbered preset voltage values are sequentially released to the even output of said multiplexer means by said even multiplexer circuit for the time duration of respective sequential even timing pulses received, such that the odd and even outputs of said multiplexer means have alternate multiplexed present voltage values overlapped in time by a half-period.

* * * * *